(12) United States Patent
Yoneyama et al.

(10) Patent No.: US 6,426,772 B1
(45) Date of Patent: Jul. 30, 2002

(54) VIDEO ENCODER

(75) Inventors: Akio Yoneyama, Tokyo; Yasuyuki Nakajima; Hiromasa Yanagihara, both of Saitama; Masaru Sugano, Tokyo, all of (JP)

(73) Assignee: KDDI Corporation, Tokyo (JP)

( * ) Notice: Subject to any disclaimer, the term of this patent is extended or adjusted under 35 U.S.C. 154(b) by 0 days.

(21) Appl. No.: 09/167,886

(22) Filed: Oct. 7, 1998

(30) Foreign Application Priority Data

Oct. 17, 1997 (JP) .............................................. 9-299645

(51) Int. Cl.[7] .............................................. H04N 7/18
(52) U.S. Cl. .............................. 348/240.02; 375/240.03
(58) Field of Search ........................ 375/240.03–240.07

(56) References Cited

U.S. PATENT DOCUMENTS

| | | | | |
|---|---|---|---|---|
| 5,612,751 A | * | 3/1997 | Kondo ................... | 375/240.12 |
| 5,949,487 A | * | 9/1999 | Blanchard .............. | 375/240.03 |
| 6,084,909 A | * | 7/2000 | Chiang et al. ......... | 375/240.02 |
| 6,118,817 A | * | 9/2000 | Wang .................... | 375/240.07 |
| 6,181,742 B1 | * | 1/2001 | Rajagopalan et al. .. | 375/240.02 |

* cited by examiner

Primary Examiner—Andy Rao
(74) Attorney, Agent, or Firm—Armstrong, Westerman, Hattori, McLeland & Naughton, LLP

(57) ABSTRACT

A next input image selector 8 specifies a time at which an input image to be processed next is to be input immediately after finishing an encoding of one image. An input video capture 1 obtains an image of which input time has been specified and sends this image to an input image information detector 2. The input image information detector 2 makes a decision as to whether or not the input image is an image to be processed based on an image variance between this input image and an input image processed immediately before stored in a frame memory 3. If this decision is negative, an input image re-selector 4 re-selects an image to be processed, and if the decision is affirmative, this input image is sent as an image to be processed to a target output bits setter 5 and a motion predictor 11. An output bits controller 6 determines a quantizing level of a quantizer 14 from target output bits and actual output bits obtained from an encoder 15. A video encoder capable of encoding images in uniform picture quality with realtime processing feature can be provided.

9 Claims, 4 Drawing Sheets

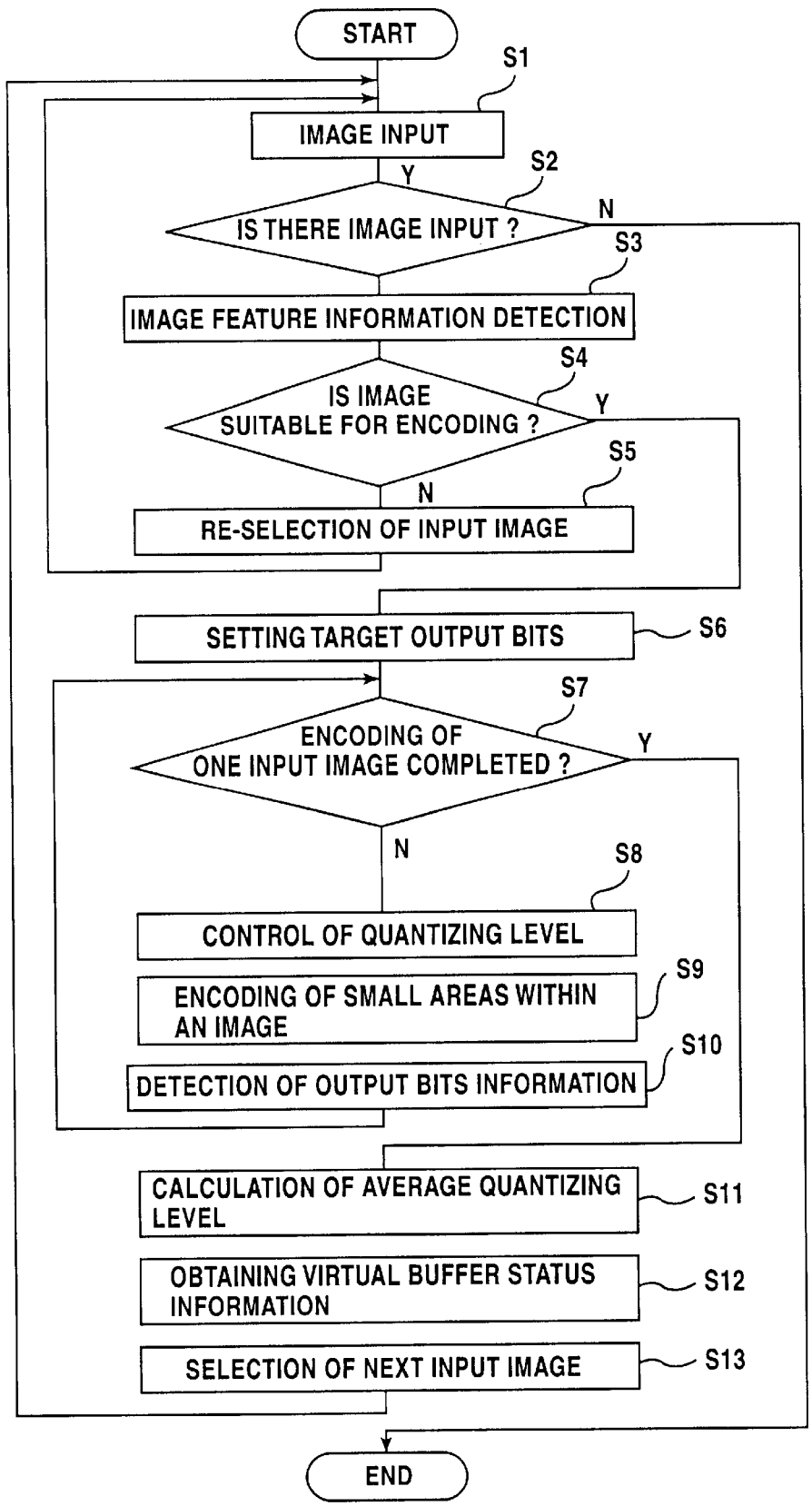

VIDEO ENCODER

BACKGROUND OF THE INVENTION

1. Field of the Invention

The present invention relates to a video encoder, and relates, more particularly, to a video encoder using a so-called bit-rate control for controlling the number of output bits to become a constant volume during a predetermined period of time.

2. Description of the Related Art

As one of conventional systems of a video encoder for controlling the number of output bits to be a constant volume during a predetermined period of time, there has been proposed a system that controls the number of output bits by only changing the quantizing level based on fixed constant time interval for input images that are processed (a first conventional system).

As another control system, there has been proposed a method for achieving uniform picture quality as a whole by controlling in advance the number of output bits to be generated in the future based on pre-obtained information on images which are ahead of images currently being processed (a second conventional system).

According to the above-described first conventional method, however, as the time interval for input images to be processed is fixed at a constant rate, it is only possible to allocate an almost uniform volume of bits both to images that do not require much information and to images that require much information in video encoding. Accordingly, it is not possible to make uniform the overall picture quality as allocation of the number of bits is not performed according to the complexity from an encoding point of view.

Further, according to the above-described second conventional system, as the number of bits are controlled by utilizing image information to be processed in the future, there occurs a processing delay without an exception in the case of processing images by placing a weight on realtime processing. Accordingly, it is difficult to apply this method to a processing that attaches a great importance to realtime processing.

SUMMARY OF THE INVENTION

It is an object of the present invention to provide a video encoder that can make it possible to make uniform the overall picture quality in the case where input video images change greatly due to motion or the like during a certain period of time and in the case where image features vary suddenly due to a scene change or the like. It is another object of the present invention to provide a video encoder that can perform video encoding with uniform picture quality without using future image information, that is, a video encoder that can perform a video encoding with uniform picture quality based on a realtime processing.

In order to achieve the above objects, according to a first aspect of the invention, there is provided a video encoder using a rate control for controlling the number of output bits to become constant during a certain period of time, wherein the video encoder includes: means for specifying a time at which an input image to be processed next is to be input after finishing an image encoding, based on at least a variance of the number of output bits of an input image from a scheduled number of output bits, a skip time interval between processed images previously detected from a video picture, and a virtual buffer status of an encoded information virtual storage for temporarily storing an encoded signal for transmission; and means for deciding whether or not an input image to be processed next selected based on the time specification is an image to be processed [or not] from an image variance between the input image and an image processed immediately before.

According to the above-described aspect of the invention, it becomes possible to make variable the time interval between video images to be encoded and it also becomes possible to change a video input image to be encoded from pixel information of the image to be processed, thereby making it possible to encode video images without losing a realtime processing feature.

Further, according to a second aspect of the invention, there is provided a video encoder for dividing the selected image to be processed into a plurality of small areas, with a target number of output bits set for each small area, and for determining quantizing levels of small areas to be sequentially encoded next based on the target number of output bits for each small area and the actual number of output bits of each small area sequentially encoded.

According to this aspect, it becomes possible to achieve uniform picture quality of the encoded video images.

BRIEF DESCRIPTION OF THE DRAWINGS

FIG. 5 is a flowchart for showing an outline operation of the present invention.

DETAILED DESCRIPTION OF THE PREFERRED EMBODIMENT

Figure 1:
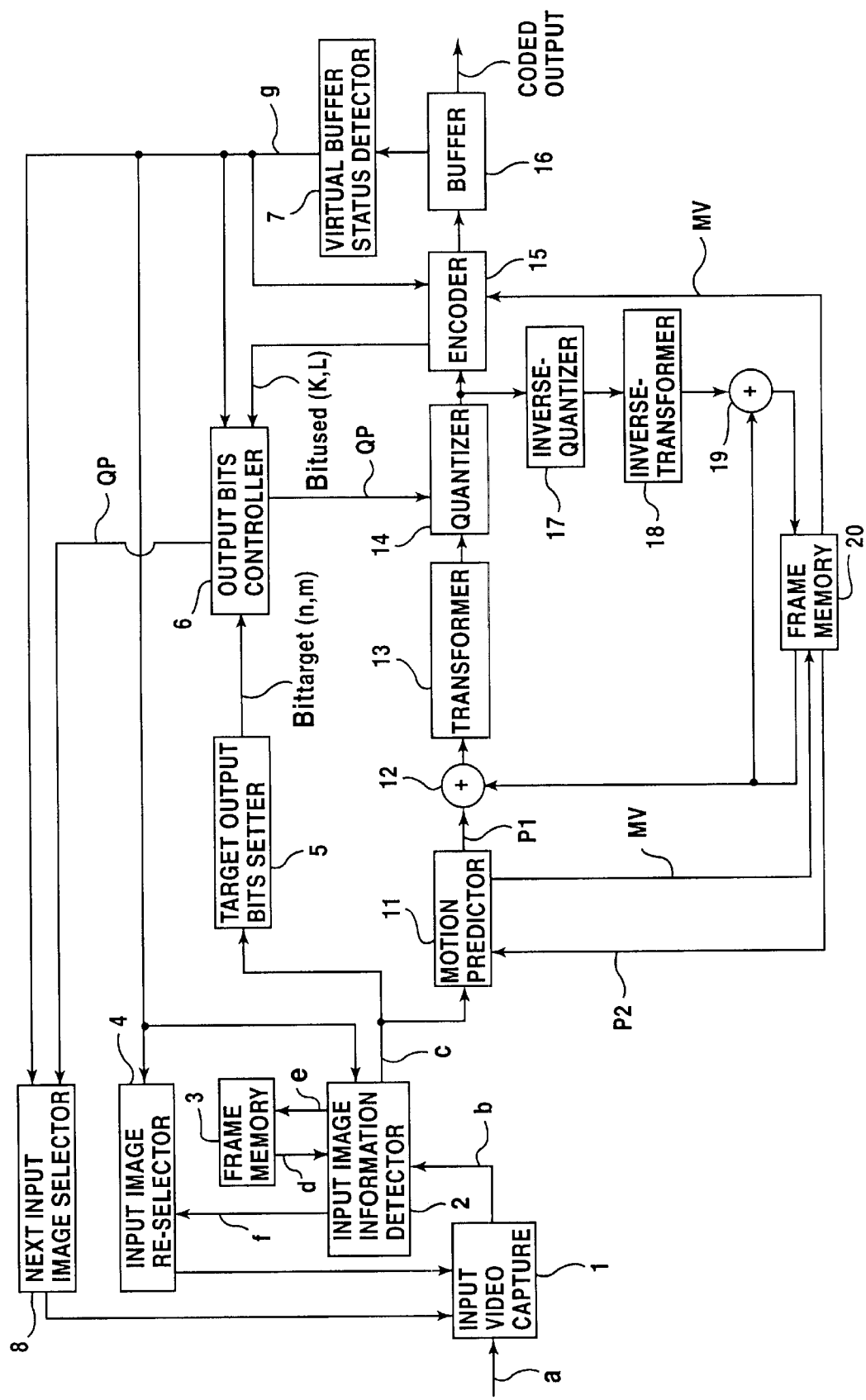
FIG. 1 is a block diagram for showing a structure of one embodiment of the present invention.

FIG. 1 is a block diagram for showing a structure of a first embodiment of the present invention. This embodiment performs a bit-rate control to an encoding system according to H263 which is an international standard of a video coding scheme, and the present invention is not limited to this.

Referring to FIG. 1, an input video capture 1 selectively obtains an image to be processed from an input video a, that is, a continuation of still images periodically input. The image to be processed is obtained based on instructions from an input image re-selector 4 or a next input image selector 8 to be described later. An input image information detector 2 makes a decision as to whether or not an input image b obtained by the input video capture 1 is suitable as an image to be processed. A frame memory 3 holds image data of a video image processed last time or immediately before.

Figure 2:
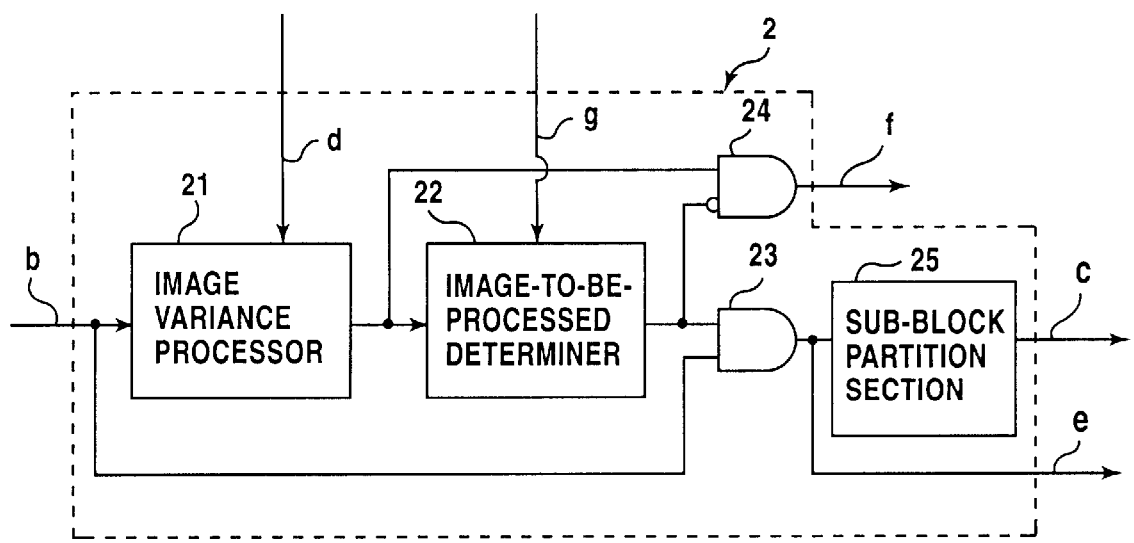
FIG. 2 is a block diagram for showing a function of an input image information detector in FIG. 1.

The input image information detector 2 has an image feature variance detecting function, and includes an image variance processor 21, an image-to-be-processed determiner 22, a processed-image output 23, an image variance output 24, and a sub-block partition section 25, as shown in FIG. 2, which is a functional block diagram of the input image information detector 2.

In FIG. 2, the image variance processor 21 obtains an image variance $Frame_{diff}$ between the input image b and a previously processed image d stored in the frame memory 3, from the following expression (1).

$$Frame_{diff} = \frac{1}{NM} \sum_{(n,m)=(0,0)}^{(N-1,M-1)} abs(Pix_{now}(n, m) - Pix_{prev}(n, m)) \quad (1)$$

In this case, the input image has N×M pixels and Pix (n, m) denotes a value of a component held by the pixel at a position (n, m). Either a luminance component or a color difference component or respectively. In the expression (1), abs represents an absolute value, and this remains so in the following other expressions. The value $Frame_{diff}$ obtained from the expression (1) shows an average variance between the pixels of the previously processed image d and the input image b at the same position. Therefore, it becomes possible to predict output bits in the video encoding from a large or small of this value.

It is also possible to obtain the image variance $Frame_{diff}$ by sub-sampling (utilizing only a representative point). In place of the image variance $Frame_{diff}$, a squared difference can also be used. Further, in place of the input image, a prediction error after a motion compensation can also be used.

The image-to-be-processed determiner 22 makes a decision as to whether or not the input image b is suitable as an image to be processed from a relationship between the image variance $Frame_{diff}$ and a currently available bit volume g ($bit_{avail}$) from a virtual buffer status detector 7 to be described later. If the currently available bit volume g ($bit_{avail}$) is smaller than a bit volume for encoding with suitable picture quality obtained based on the image variance $Frame_{diff}$, it is not possible to perform a video encoding with guaranteed picture quality. Therefore, in this case, a decision is made that it is not suitable to use the input image b as an image to be processed. In the opposite case to the above, a decision is made that it is suitable to use the input image b as an image to be processed.

If a decision has been made that it is not suitable to use the input image b as an image to be encoded, the input image b so far used as an image to be processed next is deleted immediately and the image variance f is sent to the input image re-selector 4. The input image re-selector 4 determines a time T at which an image to be processed is selected based on the image variance f and the currently available bit volume g ($bit_{avail}$) from the virtual buffer status detector 7 to be described later, and then takes image information to be input at the time T as an image to be newly processed from the input video capture 1.

The time T can also be obtained from the following expression (2), for example.

$$T = (Frame_{diff} \times \alpha - bit_{avail})/Bitrate \quad (2)$$

where, α is a constant, $bit_{avail}$ represents maximum output bits that can be utilized for encoding at this point of time, and Bitrate is a bit rate to be output by the video encoding, that is, a target bit rate.

On the other hand, if a decision has been made that it is suitable to use the input image b as an image for encoding, the input image b is divided into small areas (macro blocks) c that become a unit for encoding in the sub-block partition section 25. Each small area c is sent to the target output bits setter 5 and a motion predictor 11.

The motion predictor 11, a subtractor 12, a transformer 13, a quantizer 14, an encoder 15, a buffer 16, an inverse quantizer 17, an inverse transformer 18, an adder 19 and a frame memory 20 constitute an encoding system according to H263 which is an international standard of a video coding scheme. As the operation of this structure is known, its explanation will be omitted. In the drawing, MV represents motion vector information, and P1 and P2 represent image information respectively.

The target output bits setter 5 calculates a yardstick for setting a target number of output bits to be used at the time of encoding the input image b to keep uniform picture quality within the image.

This will be explained based on an example. The target output bits setter 5 at first further divides each small area obtained by the sub-block partition section into four areas. The target output bits setter 5 then calculates an average pixel value $Pix_{AVE}$ within each divided area. By using this average pixel value, the target output bits setter 5 calculates activity Act for each area from the following expression (3).

$$Act_n = \sum_{(k,l)=(0,0)}^{(K-1,L-1)} abs(Pix(k, l) - Pix_{Ave}) \quad (3)$$

This $Act_n$ can be called an absolute error sum of a pixel value within a divided area and an average pixel value or a variance of a pixel value. The expression (3) can also be calculated as a squared error sum by squaring errors.

Next, a difference $Act_{dif}$ between a maximum value $Act_{Max}$ and a minimum value $Act_{Min}$ of $Act_1$ to $Act_4$ obtained in the four areas are calculated as follows.

$$Act_{dif} = Act_{Max} - Act_{Min}$$

If $Act_{dif}$ is large, that is, if the difference of variance is large, it is predictable that the number of output bits becomes large when video encoding is carried out.

The target output bits setter 5 at first sets a target number of output bits for a total picture to be processed. For this purpose, $Act_{dif(n, m)}$ is obtained for all the small areas, and a total sum $\Sigma Act_{dif}$ of activity differences within an image to be processed is calculated. The target output bits setter 5 sets a target number of output bits $Bit_{target}$ for the total image to be processed by the following expression by utilizing a total sum of activity differences $\Sigma Act_{dif-last}$ between the image to be processed and an image processed immediately before, number of output bits $Bit_{used}$ of the image processed immediately before and an average quantizing level $QP_{mean-last}$ value within the image processed immediately before, based on the value of $\Sigma Act_{dif}$ and a target quantizing level $QP_{target}$ of the image to be processed.

$$Bit_{target} = W1(QP_{mean-last}/QP_{target}) \times W2(\Sigma Act_{dif}/\Sigma Act_{dif-last}) \times Bit_{used}$$

In the above expression, W1 and W2 are weight coefficients.

Next, a target number of output bits $Bit_{target(n, m)}$ for each small area are set by the following expression by distributing bits to each small area according to the difference of variance $Act_{dif(n, m)}$ for each small area obtained above.

$$Bit_{target(n, m)} = Bit_{target} \times Act_{dif(n, m)}/\Sigma Act_{dif}$$

The target number of output bits $Bit_{target(n, m)}$ are output to the output bits controller 6.

Although a minimum unit for predicting a motion is divided into four areas in the above example, the present invention is not limited to this number. From the above explanation, it is clear that the target number of output bits $Bit_{target(n, m)}$ can be obtained for each of the above divided areas.

Figure 3A:
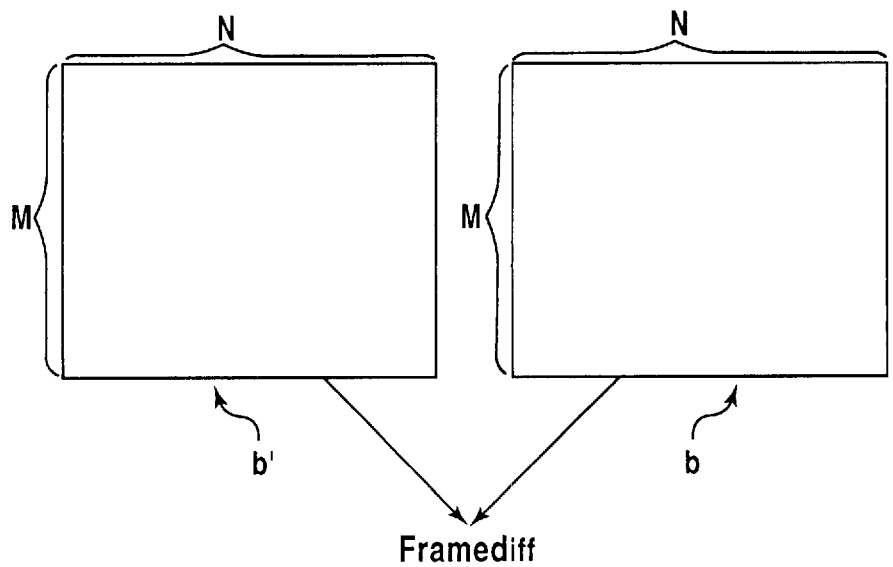
FIGS. 3A, B and C are explanatory diagrams for showing a schematic structure of an operation of the input image information detector and a target output bits setter respectively in FIG. 1.
Figure 3B:
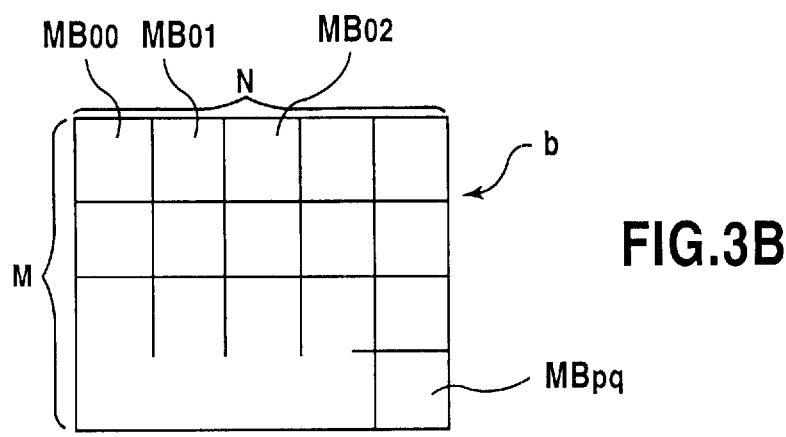
Figure 3C:
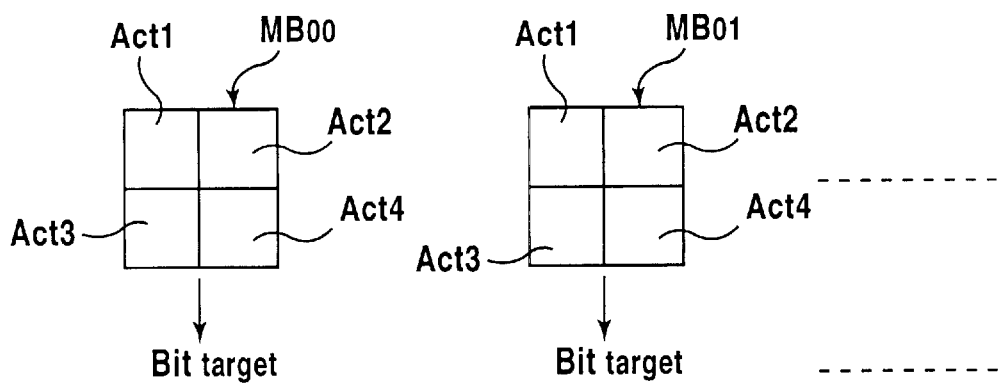

The above operation is explained in a simple understandable manner as shown in FIGS. 3A to C. The image variance processor 21 of the input image information detector 2 obtains the image variance Frame by the expression (1) from, for example, the input image b of one frame and an image b' processed in the previous one frame stored in the frame memory 3, as shown in FIG. 3A. When the currently available bit volume $bit_{avail}$ is larger than a bit volume for encoding with suitable picture quality obtained based on the image variance $Frame_{diff}$, the sub block partition section 25 divides the selected input image b into small areas (for example, macro block) $MB_{00}$, $MB_{01}$, ..., $MB_{pq}$ as shown in FIG. 3B. The target output bits setter 5 further divides each of the small areas $MB_{00}$, $MB_{01}$, ..., $MB_{pq}$ into four areas and obtains activities $Act_1$ to $Act_4$ for each of the four divided areas as shown in FIG. 3C. The target output bits setter 5 obtains $Act_{dif}$ from these activities $Act_1$ to $Act_4$, obtains the target number of output bits $Bit_{target(n, m)}$ for each small area from the above expression and outputs the obtained result to the output bits controller 6.

Next, the output bits controller 6 allocates the target number of output bits $Bit_{target(n, m)}$ for each small area sent from the target output bits setter 5 to each small area within the image to be processed, and this target number of output bits are used as reference information for a quantizer 14 to determine a quantizing level.

A control of a quantizing level by the quantizer 14 directly affects the number of output bits generated by video encoding. When a quantizing level takes a smaller value, the number of output bits become larger and, on the other hand, when the quantizing level takes a larger value, the number of output bits become smaller. However, because a large variation in the quantizing level brings about a large variation in picture quality, it is desirable that the quantizing level is not varied to any greater extent.

Thus, the output bits controller 6 controls the number of output bits by carrying out the following processing for each encoding of a small area within an image being encoded by using the target the number of output bits $Bit_{target}$.

At first, for an image currently being encoded, the output bits controller 6 obtains, by using $Bit_{used(K, L)}$ from the encoder 15, the actual number of output bits generated from the starting of the encoding of this one image to a portion of a small area (an encoding finished small area portion) at which the encoding is finished. Next, the output bits controller 6 compares the actual number of output bits with a sum of a target number of output bits from the starting of an encoding to a portion corresponding to the encoding finished small area based on the target number of output bits value obtained by the target output bits setter 5. By utilizing this difference, the output bits controller 6 sets a quantizing level QP of a small area to be encoded next based on the following expressions (4) to (6). Because this quantizing level can be obtained relatively from a quantizing level used immediately before, it is possible to set this quantizing level without permitting a large difference of picture quality. A quantized level QP that has been set is sent to the quantizer 14.

$$\text{if} \left( \gamma \sum_{(n,m)=(0,0)}^{(K,L)} Bit_{target(n,m)} < \sum_{(n,m)=(0,0)}^{(K,L)} Bit_{used(n,m)} \right) \quad (4)$$

$$\{QP = QP_{last} + \varepsilon_1\}$$

$$\text{else if} \left( \delta \sum_{(n,m)=(0,0)}^{(K,L)} Bit_{target(n,m)} > \sum_{(n,m)=(0,0)}^{(K,L)} Bit_{used(n,m)} \right) \quad (5)$$

$$\{QP = QP_{last} - \varepsilon_2\}$$

$$\text{else } \{QP = QP_{last}\} \quad (6)$$

where $\gamma$ is a constant larger than 1 and $\delta$ is a constant smaller than 1. $\varepsilon_1$ and $\varepsilon_2$ are corrected values of the quantizing levels QP and $\varepsilon_1$ may be equal to $\varepsilon_2$. It is assumed that when the number of the last small area (the right bottom small area) of one image is expressed as MB (reference FIG. 3B), the (K, L) in the expressions (4) and (5) sequentially take the values of (0, 1) to (p, q).

The operation of the above expressions (4) to (6) will be explained in detail. For example, the quantizing level QP of a small area MB to be quantized next is set as follows from the target number of output bits and the actual number of output bits in small areas MB and MB respectively. That is, $\gamma(Bit_{target(0, 0)}+Bit_{target(0, 1)})$ and $(Bit_{used(0, 0)}+Bit_{used(0, 1)})$ are compared and $\delta(Bit_{target(0, 0)}+Bit_{target(0, 1)})$ and $(Bit_{used(0, 0)}+Bit_{used(0, 1)})$ are compared. For example, if $\gamma(Bit_{target(0, 0)}+Bit_{target(0, 0)})$ is less than $(Bit_{used(0, 0)}+Bit_{used(0, 1)})$, then the quantizing level QP of the small area $MB_{02}$ to be quantized next is set to $QP_{last}+\varepsilon_1$. On the other hand, if $\delta(Bit_{target(0, 0)}+Bit_{target(0, 1)})$ is larger than $(Bit_{used(0, 0)}+Bit_{used(0, 1)})$, then the quantizing level QP is set to $QP_{last}-\varepsilon_2$. Further, if $\delta(Bit_{target(0, 0)}+Bit_{target(0, 1)})<(Bit_{used(0, 0)}+Bit_{used(0, 1)})<\gamma(Bit_{target(0, 0)}+Bit_{target(0, 1)})$, then the quantizing level QP is set to $QP_{last}$. The $QP_{last}$ is a quantizing level QP used for a small block immediately before. Quantizing level QP for each small area to the small area $MB_{pq}$ can be set sequentially in a similar manner.

Another method for obtaining a quantizing level QP for each small area will be explained next. In this method, a quantizing level QP is updated based on a comparison between the target number of output bits $bit_{target(current)}$ of a small area to be encoded next and the target number of output bits $bit_{target(prev)}$ of a small area encoded immediately before, as shown by the following expression (7). By this updating, it becomes possible to correspond instantly to a change in feature of the input image for each small area.

$$QP=QP+\zeta \times bit_{target(prev)}/bits \ bit_{target(current)} \quad (7)$$

In the above expression, $\zeta$ is a parameter for controlling the size of a level change.

As a third method for obtaining a quantizing level QP for each of the above small areas, there is available a method of using an average or a weighted average of the quantizing level QP obtained from the expressions (4) to (6) and the quantizing level QP obtained from the expression (7).

The operation of the next input image selector 8 will be explained next. When it is assumed that a skip time interval between an image processed immediately before and an image processed immediately before this image is expressed as $T_{last}$, an average of quantizing levels used within the image processed immediately before is expressed as Mean-$QP_{last}$ and a quantizing level necessary for achieving target picture quality is expressed as $QP_{target}$, then the input image selector 8 obtains a time $T_{next}$ at which an image to be processed is to be taken in from the following expression (8) immediately after finishing an encoding of one image. In this case, it is assumed that the quantizing level $QP_{target}$ is a predetermined value and is preset in the next input image selector 8. It is also assumed that MeanQP$_{last}$ is calculated based on a quantizing level QP obtained from the output bits controller 6 by the next input image selector 8.

In the above expression, η represents information of an encoding virtual buffer 16, that is, a value obtained from the available number of bits obtained from the virtual buffer status detector 7. It is also possible to change T$_{next}$ based on this value.

The operation of the above embodiment is briefly summarized in a flowchart shown in FIG. 5. At step S1, a video image b is input to the input image information detector 2. At step S2, a decision is made as to whether or not there is an input of the video image. If the decision is affirmative, the process goes to step S3 and the input image information detector 2 detects image feature information by the expression (1). Then, at step S4, a decision is made as to whether or not the video image b is an image suitable for encoding. If the decision is negative, the process goes to step S5 and the input image re-selector 4 re-selects an input image. The process returns to step S1 and the input image information detector 2 waits for a next input image b. On the other hand, if the decision at step S4 is affirmative, the process goes to step S6 and the target output bits setter 5 sets a target number of output bits.

At step S7, a decision is made as to whether or not the encoding of one input image has been finished. If the decision is negative, the process goes to step S8 and the output bits controller 6 controls a quantizing level to the quantizer 14. At step S9, the quantizer 14 encodes a small area within an image. At step S10, the output bits controller 6 detects the number of output bits information from the encoder 15. The operation from steps S7 to S10 is repeated. If a decision at step S7 is affirmative, the process goes to step S11 and the next input image selector 8 calculates an average quantizing level MeanQP$_{last}$ from quantizing level information obtained from the output bits controller 6. At step S12, the next input image selector 8 obtains virtual buffer status information from the virtual buffer status detector 7. Then, at step S13, the next input image selector 8 selects a next input image. Thus, the input video capture 1 selectively obtains an input image from a video image a. The process returns to step S1, and at steps S1 to S4, a decision is made as to whether or not the obtained image is an image suitable for encoding. If the decision is negative, the obtained image is abandoned, and the input image selector 4 re-selects an input image at step S5.

As explained above, according to the present embodiment, the input image information detector 2 decides whether or not an image selected by the next input image selector 8 is an image suitable for encoding. If this decision is affirmative, this image is encoded, and, on the other hand, if the decision is negative, the input image re-selector 4 re-selects an image to be encoded. An image selected as an image suitable for encoding is encoded at steps S7 to S10 according to a quantizing level of the next small area set based on a target number of output bits of a small area and the actual number of output bits.

Figure 4:
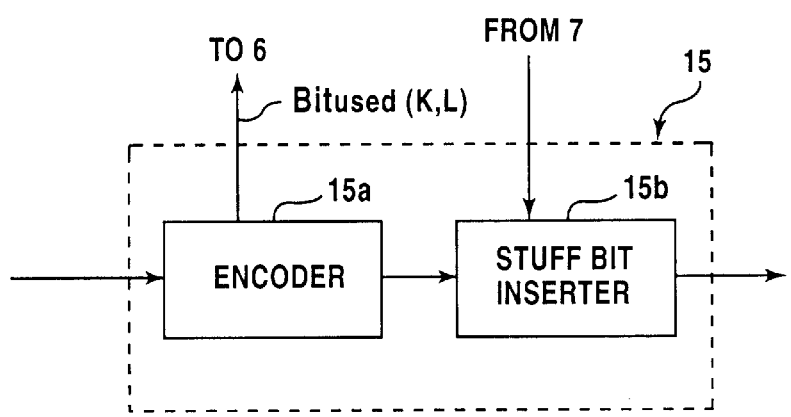
FIG. 4 is a block diagram for showing one example of an encoder in FIG. 1.

The encoder 15 of the present embodiment consists of an encoder 15a and a stuff bit inserter 15b as shown in FIG. 4. Virtual buffer status information from the virtual buffer status detector 7 is input to the stuff bit inserter 15b.

During an encoding operation, there occurs such a case where a target number of output bits cannot be generated but video encoding is completed with a smaller number of output bits than the target number of output bits if the operation is controlled to generate output bits of a constant volume during a predetermined period of time. If such a status arises continuously, in a system for receiving an encoded signal through a communication channel and immediately decoding the received signal, there is a risk of an occurrence of a so-called buffer overflow, that is, a buffer volume of the received information exceeds a capacity of the buffer.

To overcome this difficulty, the dummy bit inserter 15b inserts into encoding dummy data bits having no meaning in the coding rule according to the encoding system, so that the number of output bits of an image to be encoded are set higher than the target number of output bits. The system of the present invention allows a selective time width to be held in a time interval between input images to be processed. So long as a time position of an image to be encoded next does not become firm, it is impossible to make a decision whether a buffer volume of received information exceeds the capacity or not. Therefore, according to the system of the present invention, a minimum necessary volume of bits to be inserted is calculated in advance so that the buffer volume of received encoded information does not exceed the buffer capacity, in a status such that the encoding of one input image has been carried out to a position immediately before the completion of the encoding of the entire image. Then, the bits are inserted by the calculated volume. The encoding thereafter is carried out as usual.

The present invention can be applied to video encoding data using an international standard coding system, such as not only H263, but also MPEG1, MPEG2, H261, etc. The transformation system can also be applied to a video encoding system utilizing a wavelet transformation, a vector quantizing, etc. as well as a DCT transformation.

As is clear from the above explanation, according to the present invention, it becomes possible to keep the number of output bits at a suitable level even under a condition of a rapid change in picture quality of an input image, without any time constraint such as a need for reading information of a plurality of input images in advance. As a result, there is an effect that a video can be encoded in real time with improved picture quality and improved encoding efficiency as well. For example, there was a problem of an extreme deterioration in picture quality during an occurrence of a change in the feature of images (such as a rapid image change or a scene change) according to the bit-rate control system in the ITU-T advice H263TMN5. However, it has been confirmed that in the present invention, no variation in picture quality is recognized by a subjective evaluation.

What is claimed is:

1. A video encoder using a rate control for controlling output bits to become constant during a certain period of time, the video encoder comprising:

means for specifying a time at which an input image to be processed next is to be input after finishing an image encoding, based on at least a variance of a number of output bits of an input image from a scheduled number of output bits, a skip time interval between processed images previously detected from a video picture, and a virtual buffer status of an encoded information virtual storage for temporarily storing an encoded signal for transmission;

means for deciding whether or not an input image to be processed next which is selected based on the time specification is an image to be processed or not from an image variance between the input image and an image processed immediately before; and means for re-selecting an image to be processed based on image variance between this input image and an image processed immediately before, when the decision has been made that an input image selected based on the time specification is not an image to be processed, wherein the input image to be processed is determined from the video picture.

2. A video encoder according to claim 1, wherein the video encoder divides the selected image to be processed into a plurality of small areas, sets target output bits for each small area, and determines quantizing levels of small areas to be sequentially encoded next based on the target output bits for each small area and actual output bits of each small area sequentially encoded.

3. A video encoder according to claim 1, wherein the video encoder divides the selected image to be processed into a plurality of small areas, sets target output bits for each small area, and determines quantizing levels of small areas to be sequentially encoded next based on the target output bits for each small area and actual output bits of each small area sequentially encoded.

4. A video encoder according to claim 1, wherein a variance of output bits of the input image from the scheduled output bits is a ratio of an average quantizing level of the input image to a scheduled quantizing level of the image.

5. A video encoder according to claim 1, wherein a variance of output bits of the input image from the scheduled output bits is a ratio of an average quantizing level of the input image to a scheduled quantizing level of the image.

6. A video encoder using a rate control for controlling output bits to become constant during a certain period of time, comprising:

an input image formation detector for making a decision as to whether or not an input image is an image to be processed from an image variance between an input image processed immediately before and this input image;

an input image re-selector for re-selecting an input image when a decision has been made by the input image information detector that the input image is not an image to be processed;

a target output bits setter for setting a target number of output bits for each small area of an input image when a decision has been made by the input image information detector that this input image is an image to be processed;

an output bits controller for determining a quantizing level for each small area based on said target number of output bits and an actual number of output its in each of the small areas respectively;

a next input image selector for specifying a time at which an input image to be processed next is to be input, based on at least a variance of an output number of bits of an input image from a scheduled number of output bits, a skip time interval between previously processed image that are detected, and a virtual buffer status of an encoded information virtual buffer for temporarily storing an encoded signal; and an input video capture for obtaining an input image re-selector and the next input image selector.

7. A video encoder according to claim 6, wherein the output bits controller sets said target number of output bits for each small area by utilizing a difference in size of a variance of pixel values due to a difference in areas which are obtained by further dividing the small area into small areas.

8. A video encoder according to claim 1, wherein there is provided a stuff bit inserter for inserting dummy bits of meaningless information at a specified position within encoding information in order to make said number of output bits constant during a predetermined period of time.

9. A video encoder according to claim 6, wherein there is provided a dummy bit inserter for inserting dummy bits of meaningless information at a specified position within encoding information in order to make said number of output bits constant during a predetermined period of time.

* * * * *